Nov. 26, 1957  E. B. CLARK  2,814,510
NON-METALLIC CABLE CLAMP FOR A BEVELED CORNER BOX
Filed Sept. 15, 1954
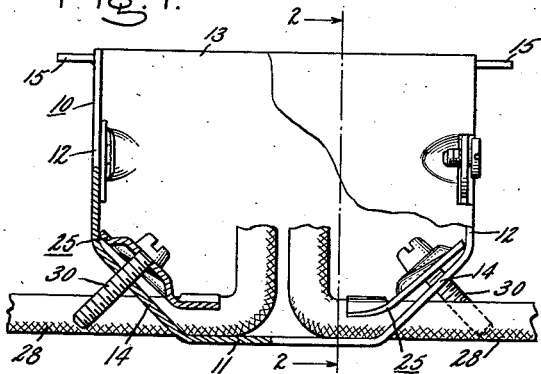
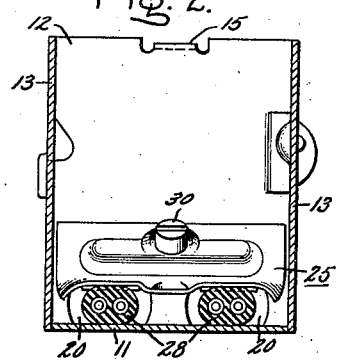
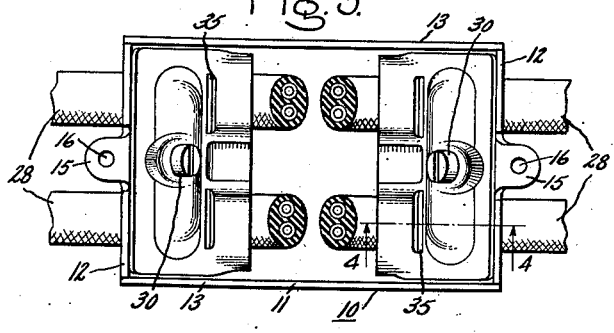
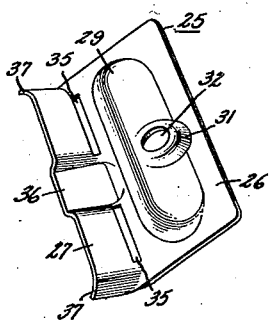
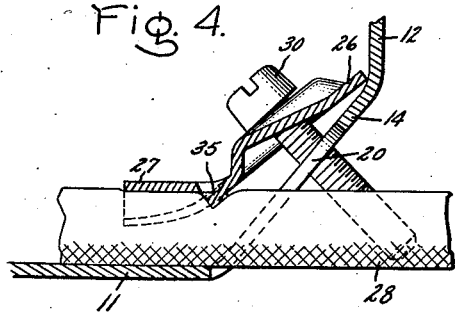
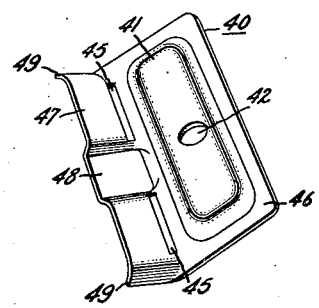
Inventor:
Edward B. Clark,
by Allard A. Braddock
His Attorney

United States Patent Office 2,814,510
Patented Nov. 26, 1957

2,814,510

NON-METALLIC CABLE CLAMP FOR A BEVELED CORNER BOX

Edward B. Clark, Milford, Conn., assignor to General Electric Company, a corporation of New York Application September 15, 1954, Serial No. 456,128

2 Claims. (Cl. 285—129)

The present invention relates to a sheet metal clamp for use in an electric box such as an outlet box to clamp the ends of non-metallic sheathed cable therein. This invention is specially adapted for use in a beveled corner box wherein the cable enters the box through pry-out openings in the beveled corners.

In the past, beveled corner switch boxes have been provided with non-metallic cable clamps which fall into two general categories. There have been those which were fastened by screws which are threaded into the bottom wall of the box and those in which the fastening screw extended through the beveled corners of the box. Difficulties have been experienced with some of these prior art clamps in attempting to clamp the cable because the clamps would collapse or bend out of shape under the force of the head of the screw so that the clamp would be in contact with the walls of the box before a sufficient amount of pressure was brought to bear on the cable end. Further tightening of the screw would not always move the clamp against the cable, but would merely tend to strip the threads in the tapped hole of the box. This was true whether the fastening screw extended through the bottom or the beveled corner of the box.

An additional difficulty was experienced in the use of clamps using the fastening screw through the bottom wall of the box. In many types of non-metallic cable clamps there is an elongated hole provided to allow for a certain amount of shifting action so as to provide the most advantageous clamping force for different sizes of cable. When the screw is tightened in the bottom wall of the box, there is no tendency to force the clamp against the beveled corner of the box to close or seal the pry-out openings through which the cable extends to limit the danger of arcing flashes from spreading from the box to cause a fire hazard. Consequently, this invention contemplates the use of a non-metallic clamp which is fastened by a screw extending through the beveled corner of the box that will force the clamp against the beveled corner to completely overlie the pry-out openings. A transverse embossment is also formed on the clamp to prevent the buckling or collapsing of the clamp during the tightening of the screw. Lancings are formed in the clamp to bite into the sheath of the cable to resist any pulling force tending to withdraw the cable from the box.

The principal object of this invention is to provide a beveled corner switch box with a non-metallic cable clamp having a transverse raised embossment for preventing the failure of the clamp due to its buckling under the force of the fastening screw.

A further object of this invention is to provide a non-metallic cable clamp for a beveled corner box with a fastening screw extending through a transverse raised embossment formed in the clamp so as to prevent the clamp from buckling under the action of the screw, as well as to provide a sufficient area of contact between the lower edge of the screw head and the embossment to prevent the head of the screw from digging into the clamp and becoming locked or bound before the proper clamping action is exerted on the cable.

This invention will be better understood from the following description taken in connection with the accompanying drawing and its scope will be pointed out in the appended claims.

In the drawing:

Figure 1 is a partial sectional view showing a beveled corner switch box containing non-metallic cable clamps embodying my invention.

Figure 2 is a cross-sectional view taken on the lines 2—2 of Figure 1.

Figure 3 is a top plan view of the switch box of Figure 1.

Figure 4 is an enlarged cross-sectional view taken on the lines 4—4 of Figure 3 to illustrate the action of the clamp in the box.

Figure 5 is a perspective view of the cable clamp embodying my invention.

Figure 6 is a modification of the cable clamp of Figure 5, showing a different type of embossment for preventing the buckling of the clamp under the action of the fastening screw.

Referring in detail to the drawing in which like elements are represented by like reference numerals, 10 represents a conventional beveled corner switch box of sheet steel having a bottom wall 11, side walls 12 and 13 and beveled corners 14. Generally, this box is formed with the bottom wall 11, the beveled corners 14 and side walls 12 formed as one piece while the side walls 13 are two flat plates which are fastened to the remainder of the box to form a standard switch box. Oppositely extending ears 15 are located on the top edge of the side walls 12 to serve as a support means for a switch or outlet which is to be mounted in the box. Tapped holes 16 are located in the ears 15 to engage with fastening screws (not shown) for mounting such electrical devices in the box. A pair of pry-out openings 20 are formed in each beveled corner 14 to permit the entrance of cable 28 into the box so that the electrical device, such as a switch or convenience outlet, may be included in an electric circuit. A pry-out, as the name implies, is a portion of the wall of the box which has been partially stamped out to form a generally circular opening. The stamped-out portion is then forced back into the plane of the wall of the box so that, during the installation of the box in a wall structure, the pry-out may be quickly removed to form a cable-entrance opening. Pry-outs are formed in the walls of an electric box to afford ready access to the interior of the box and yet to avoid unnecessary openings being made in the box which might allow severe arcing flashes to spread from the box and cause a fire hazard. These openings are usually formed in pairs in the side walls of a box and are slightly displaced off of the bottom wall of the box although in the present instance the pry-out openings 20 in the beveled corners extend down to the level of the bottom wall of the box.

The clamp 25 which embodies my invention is of sheet metal construction as is best shown in Figure 5. The clamp has a shielding portion 26 and a clamping portion 27 which is angularly disposed with relation to the shielding portion. Looking at Figure 4, it should be appreciated that when the clamp is assembled in a box the shielding portion is disposed generally parallel with the beveled corner 14 of the box while the clamping portion 27 is arranged generally parallel with the bottom wall 11 of the box to overlie the ends of the non-metallic cables 28 which are to be clamped in the box. A transverse raised embossment 29 is formed in the upper surface of the shielding portion 26 to prevent element 26 from buckling under the downward force of the head of the screw means 30. Because of the rigidity of portion 26, the clamping portion 27 is also restrained from buckling as the screw is turned down onto the clamp. A secondary embossment 31 is formed in the central area of embossment 29 around an elongated opening 32 that receives the screw means 30. The function of the additional embossment 31, which has a top surface that is generally parallel with the plane of the shielding portion 26, is to provide a flat bearing surface for the underside of the head of the screw. This is deemed to be of importance for it has been found that if embossment 31 is eliminated, leaving only the transverse embossment 29, and the fastening screw 30 is tightened down, the head of the screw would have a point contact with the embossment and the pressure would be so great that the screw head would dig into the embossment thereby forming burrs. Ultimately the screw head would bind and prevent the further tightening of the screw to the necessary force to meet the minimum pull test of the Underwriters' Laboratories, Inc.

Thus, it will be seen that the clamp fulcrums on the upper edge of the shielding portion 26 which bears against the wall of the box. The head of the screw 30 serves as a means for applying a force to pivot the clamp about its fulcrum and down onto the cable 28 to be secured in the box.

The clamping portion 27 is disposed at an obtuse angle with relation to the top surface of the shielding portion 26, as was previously mentioned. A pair of downwardly extending lancings 35 are formed in the bend between the said portions 26 and 27 to become embedded in the sheath of the cable ends that are to be secured by said clamp. The central section 36 of portion 27 is slightly depressed while the side edges 37 are rounded so that the clamping portion is generally adapted to conform to the cross sections of the two cable ends.

In Figure 6 a modification 40 of the clamp 25 is illustrated. Instead of the transverse embossment 29 and the secondary embossment 31 there is substituted a single transverse raised embossment 41 which has a top surface that is generally parallel with the plane of the shielding portion 46 of the clamp. Otherwise, clamp 40 is of the same configuration as the previous clamp 25. Accordingly, there is an elongated aperture 42, lancings 45, and a clamping portion 47 having a central depression 48 and rounded side edges 49.

It will be appreciated by one skilled in this art that I have provided a non-metallic cable clamp for a beveled corner switch box which is simple in design and readily adaptable to high production methods of manufacture while its most important feature is its rigidity and its capability of clamping non-metallic cable in order to pass the pull test of the Underwriters' Laboratories, Inc. Also, this clamp is of such a nature that it does not tend to pierce the insulation of the cable and possibly create a short circuit in the system due to the large bearing area provided by the clamping portion. In addition, since the fastening screw extends through the beveled corner of the box, the screw does not extend beyond the bottom wall of the box so that this box may be installed in a thin partition which will only accommodate the depth of the box. In some prior art boxes, the fastening screw extends through the bottom wall of the box about ½" to ¾" which would prevent the installation of such a box in many low cost homes now being built with thin wall partitions. Furthermore, I have provided a clamp having a fastening screw that affords the maximum amount of leverage since the portion of the screw head which bears on the clamp is on the side which is the farthest from the fulcrum point of the clamp. Consequently, the clamp is not only being forced over the pryout openings but it likewise is held down over the cable ends to satisfy all of the requirements of a satisfactory clamp for non-metallic cable.

Modifications of this invention will occur to those skilled in this art and it is to be understood, therefore, that this invention is not limited to the particular embodiments disclosed but that it is intended to cover all modifications which are within the true spirit and scope of this invention.

What I claim as new and desire to secure by Letters Patent of the United States is:

1. A sheet metal clamp for positioning non-metallic cable in a beveled corner of an outlet box, said clamp comprising a shielding portion and a clamping portion arranged at an obtuse angle to the top surface of the shielding portion, a transverse raised embossment formed on the upper surface of the shielding portion for nearly its entire width, and a pair of downwardly formed lancings located in the bend between said portions and adapted to become embedded in the cable to be clamped, and an aperture formed in said embossment for receiving a fastening screw that is adapted to be threaded into the beveled wall of the box, the area of said embossment surrounding said aperture being parallel with the plane of said shielding portion.

2. A sheet metal clamp for positioning non-metallic cable in a beveled corner of an outlet box, said clamp comprising a shielding portion and a clamping portion arranged at an obtuse angle to the top surface of the shielding portion, a transverse raised embossment formed on the upper surface of the shielding portion for nearly its entire width, and an aperture formed in said embossment for receiving a fastening screw that is adapted to be threaded into the beveled wall of the box, a top surface of said embossment being generally parallel with the plane of the shielding portion, and a pair of lancings located in the bend between said portions and extending downwardly from the clamping portion and adapted to become embedded in the cable to be clamped.

References Cited in the file of this patent
UNITED STATES PATENTS

| | | |
|---|---|---|
| 490,755 | Russell | Jan. 31, 1893 |
| 1,736,020 | Thomas | Nov. 19, 1929 |
| 1,829,776 | Wright | Nov. 3, 1931 |
| 2,378,529 | Austin | June 19, 1945 |
| 2,437,073 | Carlson | Mar. 2, 1948 |
| 2,688,417 | Bowers | Sept. 7, 1954 |